US012594204B2

(12) United States Patent
Mileti

(10) Patent No.: US 12,594,204 B2
(45) Date of Patent: Apr. 7, 2026

(54) CELL BLADDER, EXPANDABLE BLADDER, PORT SYSTEM AND ATTACHMENT SYSTEM

(71) Applicant: Unisoft Medical Corporation, Torrington, CT (US)

(72) Inventor: Robert J. Mileti, Torrington, CT (US)

(73) Assignee: Unisoft Medical Corporation, Torrington, CT (US)

( * ) Notice: Subject to any disclaimer, the term of this patent is extended or adjusted under 35 U.S.C. 154(b) by 0 days.

(21) Appl. No.: 18/763,508

(22) Filed: Jul. 3, 2024

(65) Prior Publication Data

US 2024/0350342 A1 Oct. 24, 2024

Related U.S. Application Data

(60) Division of application No. 17/234,357, filed on Apr. 19, 2021, now Pat. No. 12,070,430, which is a continuation of application No. PCT/US2019/056890, filed on Oct. 18, 2019.

(60) Provisional application No. 62/747,399, filed on Oct. 18, 2018.

(51) Int. Cl.
*A61G 7/057* (2006.01)
*A47C 27/10* (2006.01)

(52) U.S. Cl.
CPC .......... *A61G 7/05769* (2013.01); *A47C 27/10* (2013.01)

(58) Field of Classification Search
CPC ...................... A61G 7/05769; A61G 7/05776; A47C 27/08; A47C 27/081; A47C 27/082; A47C 27/083; A47C 27/084; A47C 27/10
See application file for complete search history.

(56) References Cited

U.S. PATENT DOCUMENTS

| | | | | |
|---|---|---|---|---|
| 4,982,466 A * | 1/1991 | Higgins | A47C 27/10 | 5/713 |
| 5,557,815 A * | 9/1996 | Mintz | A47C 27/00 | 297/283.1 |
| 5,647,078 A * | 7/1997 | Pekar | B29C 66/723 | 5/710 |
| 5,727,270 A * | 3/1998 | Cope | A47C 27/081 | 5/710 |
| 5,815,864 A * | 10/1998 | Sloop | A61G 7/05769 | 5/713 |
| 5,890,245 A * | 4/1999 | Klearman | A61G 7/05769 | 5/710 |

(Continued)

OTHER PUBLICATIONS

International Search Report and Written Opinion of the International Searching Authority for corresponding International Application No. PCT/US19/56890 dated Mar. 3, 2020.

*Primary Examiner* — George Sun
(74) *Attorney, Agent, or Firm* — Farber LLC

(57) ABSTRACT

A cell structure for a mattress or support where parallel cells are connected together substantially at their middle plane in series so that at least 5 tubes are sealed together in the series. In certain embodiments, feed cells are provided transverse the cell structure and the feed cells are sealed to the cell structure and include punches to allow fluid pressure form the feed cells to introduce into the cell structure. A rail cell is provide outwards of the feed cells and in certain aspects, the rail cell and alternating ones or groupings of the cells in the cell structure are provided with different pressure sources.

22 Claims, 15 Drawing Sheets

(56) References Cited

U.S. PATENT DOCUMENTS 6,018,960 A * 2/2000 Parienti ................ A47C 27/084 62/331
6,085,372 A * 7/2000 James ................ A61G 7/05784 5/713
6,148,461 A * 11/2000 Cook ................ A61G 7/05792 5/713
6,226,820 B1 * 5/2001 Navarro ............... A47C 27/088 5/655.4
8,127,386 B2 * 3/2012 Kajiwara ........... A61G 7/05776 5/713
2003/0101516 A1 * 6/2003 Hsu ...................... A47C 27/087 5/710
2003/0200610 A1 * 10/2003 Wang ..................... A47C 27/10 5/710
2005/0097674 A1 * 5/2005 Mileti ................ A61G 7/05776 5/710
2009/0165212 A1 * 7/2009 Oonishi ............... A47C 27/087 5/713
2010/0024132 A1 * 2/2010 Carlson .............. A61G 7/05776 5/710
2012/0060294 A1 * 3/2012 Dzioba .................. A47C 27/10 5/655.3
2012/0227186 A1 * 9/2012 Pile ........................ A47C 27/10 5/710
2013/0014324 A1 * 1/2013 Receveur ........... A61G 7/05769 5/691
2013/0113057 A1 * 5/2013 Taylor .................... H10D 48/50 257/417
2013/0205505 A1 * 8/2013 Mileti .................... B29D 22/02 5/654
2016/0008198 A1 * 1/2016 Takeda ................. A61G 7/0527 5/710
2016/0279005 A1 * 9/2016 Crewdson .......... A61G 7/05769
2019/0021925 A1 * 1/2019 Jiang ................... A61M 16/202
2019/0151175 A1 * 5/2019 Kelch ................ A61G 7/05776

* cited by examiner

FIG. 14
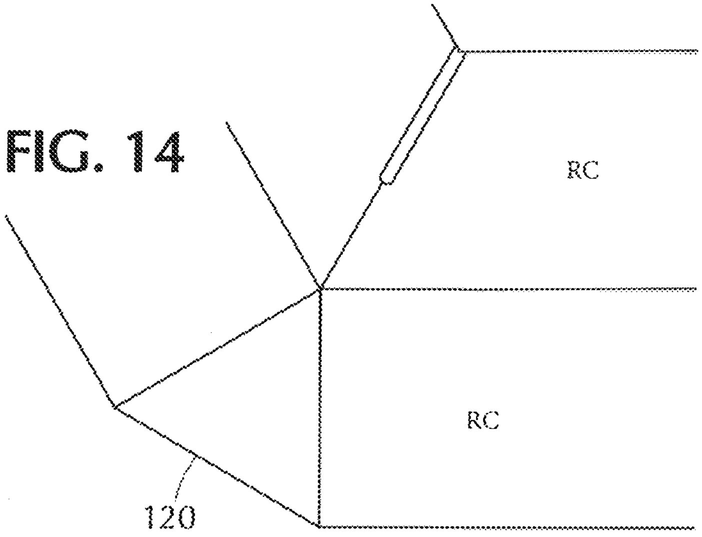
FIG. 15
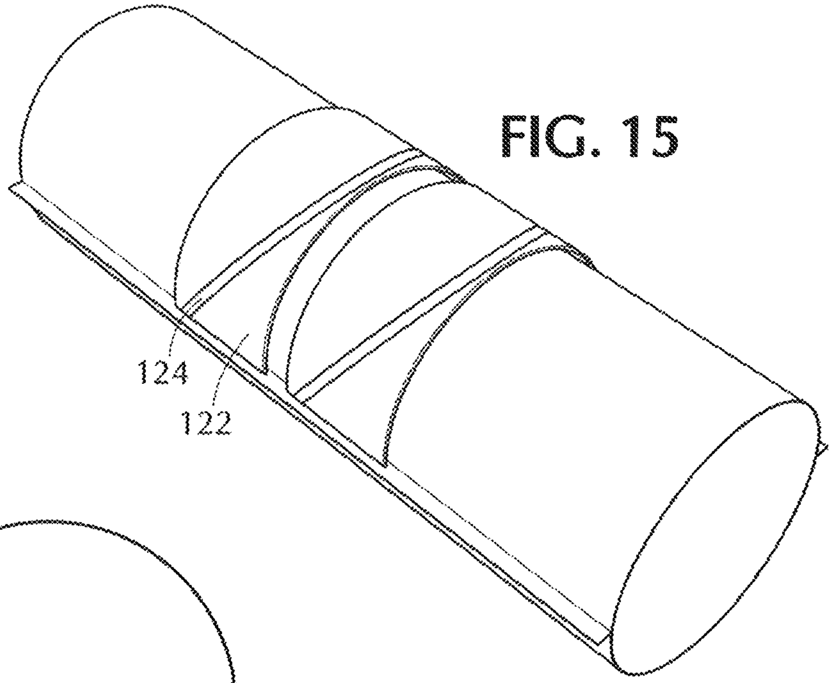
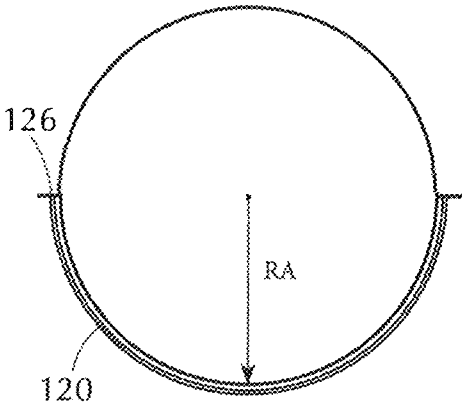
FIG. 16

CELL BLADDER, EXPANDABLE BLADDER, PORT SYSTEM AND ATTACHMENT SYSTEM

CROSS-REFERENCE TO RELATED APPLICATIONS

This application is a Divisional Application of U.S. Non-provisional application Ser. No. 17/234,537 filed on Apr. 19, 2021, which is a Continuation of PCT/US2019/056890 filed Oct. 18, 2019, which claims benefit of U.S. Provisional Application No. 62/747,399 filed on Oct. 18, 2018, the complete disclosures of which are incorporated herein by reference in their entirety for all purposes.

FIELD OF THE INVENTION

The following relates to a support system for providing pressure relieving therapy and more particularly, the following relates to a mattress or cushion structure, the cell structure which makes up that mattress/cushion and the port, attachment and expansion systems which make up such mattress/cushion.

BACKGROUND OF THE INVENTION

Pressure relieving therapy mattresses are common in hospitals as they alleviate or inhibit bedsores which can lead to infections. However, these mattresses are generally expensive and complicated to make because they involve arranging a number of tubes in an inflatable frame structure and then separately connecting each of those tubes with feed lines to a pressure source, typically two pressure sources. This work is often done by hand and is not particularly efficient. Furthermore, since the mattresses are relatively expensive, they will be used over and over again for multiple patients. This means that the mattresses must be cleaned to avoid cross contamination of what could be very dangerous bacteria and viruses. Furthermore, since each of the tubes are separate from each other, they tend to move relative to each other within the frame, causing the lower pressure tubes to collapse and the higher pressure tubes to expand upwards, this generally can cause the sleep surface to oscillate in height, depending on which tubes are high or low pressure at a given time and this can cause pressure points or higher pressure on the user's body in certain locations which can lead to bed sores.

In addition current mattresses, especially in the hospital setting, will preferably need to be secured to the bed frame with some form of clip or tie. Typical practice provides ties which connect to the outer periphery of the mattress and while they may be adequate for securing the mattress, the ties tend to get in the way of a fitted bed sheet which is designed to at least partially fit underneath and around the corners and under the bottom sides of the mattress. Furthermore, some of these beds are the type that have a mechanical riser for the feet or back. For example, a hospital bed where the patient can be moved to the upright seated position or their leg position can be adjusted. With the frame system of current mattresses being inflated, it will tend to resist bending when the support frame articulates.

SUMMARY OF THE INVENTION

It is therefore desired to provide a mattress/support/cushion system which provides for pressure relieving therapy but can be manufactured inexpensively but provide an improved support surface while easily connecting to a support frame without interference with fitted sheets One object of the invention is to provide for a support structure, preferably a mattress which allows for pressure relieving therapy by different cells having different pressure which alternates or varies.

Another object of the invention is to provide for reduced variance in support surface height and fluctuations due to differing pressures of the internal support cells.

It is a further object to provide a port system and feed tube system which enables continuous manufacturing of the support structure, including internal plumbing and connection between different groupings of cells while avoiding a need to separately tie plumbing lines to each cell.

It is yet another object to provide for an easy securing system which allows the supports to be single use (e.g. single patient use) but also provide the benefits and look of a mattress of a more permanent configuration in that the mattress provides for "tucking in" sheets and blankets but remains secured to the support frame.

It is yet another object to provide a support which can articulate with the support frame, e.g. a mattress which can bend and articulate when the underlying bed frame back/foot areas articulate relative to each other.

It is further desired to provide for a support which has a uniform generally rectangular shape in that the rails and the head and foot sections generally align with each other at the ends.

What is further desired is to provide for a support system which can be manufactured from continuous sheets of material with minimal cutting for the creation of each cell.

The terms "first" and "second" are used to distinguish one element, set, data, object or thing from another, and are not used to designate relative position or arrangement in time.

These and other objects are achieved by providing a cell structure for a mattress where parallel cells are connected together substantially at their middle plane in series so that at least 5 tubes are sealed together in the series.

In one aspect a cell bladder system for pressure relieving support comprises a base sheet extending in a longitudinal direction and a first set of a plurality of cells arranged in parallel along and on a first side of said base sheet. Each cell is formed by a first sheet of material sealed with two seals which are spaced apart from each other along the base sheet. Once seal of one cell is one of the two seals of an adjacent cell such that a length measured along the first sheet of material between the two seals is longer than the spacing of the two seals along the base sheet. Each of the first plurality of cells are formed from the first sheet of material and the base sheet which are both continuous sheets of material along more than one of the first set of the plurality of cells.

In certain aspects a second set of a plurality of cells are arranged in parallel along and on a second side of said base sheet and each cell formed by a second sheet of material sealed with two seals which are spaced apart from each other along the base sheet. One seal of one cell is one of the two seals of an adjacent cell such that a length measured along the first sheet of material between the two seals is longer than the spacing of the two seals along the base sheet. Each of the second set of the plurality of cells are formed from the second sheet of material and the base sheet which are both continuous sheets of material along more than one of the second set of the plurality of cells. In other aspects adjacent cells of the first set of the plurality of cells are in separate groupings of cells, each separate groupings of cells in fluid communication with each other but not in fluid communication with a different grouping of cells and including at least one cell. In further aspects the second set of the plurality of cells are constructed substantially as a mirror image about the base sheet of the first set of the plurality of cells. In still other aspects a first one of the separate groupings of cells including cells which are odd cells along a length of the base sheet and a second one of the separate groupings of cells are even cells along the length of the base sheet. In yet further aspects a feed cell sealed is to the base sheet and extending transverse the first set of the plurality of cells, said feed cell sealed to first ends of the first set of the plurality of cells. A plurality of perforations in the feed cell are positioned to align with one or more of the first set of the plurality of cells of a first one of the separate groupings such that fluid passes through the plurality of perforations and into the cells of the first one of the separate groupings.

In other aspects a second feed cell is sealed to the base sheet and extending transverse the first set of the plurality of cells, said feed cell sealed to second ends of the first set of the plurality of cells. A plurality of second perforations in the second feed cell are positioned to align with one or more of the first set of the plurality of cells of a second one of the separate groupings such that the feed cell feeds the first one of the separate groupings and the second feed cell feeds the second one of the separate groupings but not the first one of the separate groupings. In other aspects a first, a second and a third set of ports are provided. The first port connected to the feed cell, the second port connected to the second feed cell and the third port connected to a rail cell parallel the first and second feed cells and transverse the first set of the plurality of cells. In other aspects a plurality of tubes are provided with, two of the tubes in fluid communication with different ones of the separate groupings. In other aspects a feed cell extends transverse the first and second set of the plurality of cells and is positioned between the rail cell and the first and second set of the plurality of cells.

In other aspects the feed cell once inflated is of a smaller cross section as compared to said rail cell. In other aspects the rail cell in an uninflated configuration extends a length which is greater than a second length measured between the first seal at one end of the base sheet to the second seal at an opposite end of the base sheet.

In further aspects a rail cell extends transverse the first and second set of the plurality of cells and defines a channel configured to receive fluid pressure. An attachment element extends from between the rail cell and the second set of the plurality of cells and secured to the second sheet and the rail cell such that once the second set of the plurality of cells and the rail cell are inflated with fluid pressure, the attachment element extends away from the base sheet towards one or more ends of the attachment element. In further aspects the attachment element includes two ends which are configured to tie together around a support frame which may be a bed frame.

In further aspects, a rail cell has an outer surface and extends transverse the first and second set of the plurality of cells and defines a channel configured to receive fluid pressure, the rail cell comprised of two cells separated by the base sheet. A bottom of the two cells includes a pleat such that the outer surface of the bottom of the two cells faces itself at the pleat and is sealed to itself in a curved pattern. In further aspects, the curved pattern has a radius equal to approximately half a distance measured between two seals along a sheet which makes the bottom of the two cells, the two seals are made between the sheet which makes the bottom of the two cells and the base sheet. In further aspects the pleat is configured to expand when the cell bladder is inflated and when the cell bladder is bent by a support frame such that the rail cell includes two portions which are at an angle less than 90 degrees but greater than 0 degrees.

In another aspect a method is provided for manufacturing a cell bladder system including one or more of the steps of: providing a base sheet of material; providing a first sheet of material; providing a second sheet of material; sealing said first and second sheets of material to the base sheet to create first seals; pleating said first and second sheets of material and creating seals between said base sheet and respectively with said first and second sheets of material at locations along the respective first and second sheets which are spaced away from the seal between the respective sheet and spaced along the base sheet relative to the previous seal between the base sheet and the respective first and second sheets; repeating the pleating and creating seals steps to create a plurality of cells arranged in parallel on either side of said base sheet.

The method may further include: connecting, on a first side of the base sheet, varying ones of the cells to a first fluid pressure source; connecting, on the first side, cells adjacent to the varying ones of the cells to a second fluid pressure source; and varying a fluid pressure for the first fluid pressure source and the second fluid pressure source such that the plurality of cells move from one side to another side of a vertical plane within which the seals are located and which is perpendicular the base sheet.

In Other Aspects, During the Varying Step a Top of Each of the Cells Remains Approximately Level with a Plane Parallel the Base Sheet.

In other aspects a support system with a fluid port is provided with a body including three ports for receiving a fluid pressure therein and introducing the fluid pressure into a cell system through different ones of a plurality of pressure ports which are in fluid communication with different cells of a rail cell, a first set of a plurality of parallel cells and a second set of a plurality of parallel cells, the rail cell perpendicular to the first set of the plurality of parallel cells. The rail cell, the first set of the plurality of parallel cells and the second set of the plurality of parallel cells are part of the cell system and the each of the three ports and their corresponding cells are not in fluid communication with others of the three ports and their corresponding cells. The first and second sets of the plurality of cells share: a plurality of common seals; a first sheet; and a base sheet located between the first sheet and a second sheet, the plurality of common seals are between the first sheet and base sheet a plurality of the cells such that adjacent cells of different sets of cells share a common seal therebetween.

In certain aspects a feed cell is positioned between the rail cell and the first set of the plurality of cells, the feed cell sealed to the first set of the plurality of cells and the feed cell including a plurality of perforations which align to feed fluid pressure to a first separate grouping of the first set of the plurality of cells. In other aspects a feed cell is positioned between the rail cell and the first set of the plurality of cells and sealed to a first end of the first set of the plurality of cells. A first one of the plurality of pressure ports is connected to a first tube made from a sheet sealed to the base sheet, the first tube passes through the rail cell and the feed cell and supplies fluid pressure to a first grouping of cells selected from the first set of the plurality of cells. A second one of the plurality of pressure ports is connected to a second tube made from a sheet sealed to the base sheet, the second tube passes through the rail cell and into one side of the feed cell such that the second one of the plurality of pressure ports supplies fluid pressure to the feed cell, the feed cell including a plurality of perforations which create fluid communication between the feed cell and a second grouping of cells selected from the first set of the plurality of cells.

In further aspects a second feed cell is sealed at a second end of the first set of the plurality of cells and includes a plurality of perforations which create fluid communication between the second feed cell and the first grouping of cells. In certain aspects the first tube feeds a first cell of the first grouping of cells and the second feed cell is fed from the first cell via one of the plurality of perforations in the second feed tube.

In other aspects a pressure relieving mattress system comprises a plurality of sheets of material sealed to form a bladder, the bladder including a base sheet and a cell sheet. The cell sheet sealed to said base sheet at a plurality of seals to create a plurality of cells between said cell sheet and said base sheet, said plurality of cells oriented in a first direction. A feed sheet is sealed to said base sheet in a second direction transverse the first direction to create a feed cell and said feed sheet sealed to first ends of said cell sheet, said feed sheet having a plurality of perforations therein which align with a set of cells including at least one of said plurality of cells. A rail sheet is sealed to said base sheet to create a rail cell which extends in the second direction. The rail cell is in fluid communication with a first fluid port, said feed sheet in communication with a second fluid port, said second fluid port in fluid communication with a first set of said plurality of cells via the perforations.

In other aspects a second feed sheet is sealed to said base sheet in the second direction to create a second feed cell and said second feed sheet sealed to second ends of said cell sheet, said second feed sheet having a second plurality of perforations therein which align with a second set of cells including at least one of said plurality of cells. A first cell of the second set of cells is in fluid communication with a third fluid port which supplies fluid pressure to the second set of cells via the second plurality of perforations in the second feed cell, the second feed cell in fluid communication with the third fluid port via the first cell. In further aspects, the feed cell and the second feed cell are on opposite sides of the plurality of cells.

In other aspects a method of manufacturing a bladder is provided including one or more of the following steps (in order or arranged in a different order: feeding a base sheet; sealing a first feed sheet to the base sheet; sealing a second feed sheet to the base sheet at a location inwards of the seal of the first feed sheet; sealing, and pleating a cell sheet to the base sheet with a cross seal across the base sheet, and, at an edge zone of the cell sheet, sealing the second feed sheet to the cell sheet without sealing the cell sheet and second feed sheet to the base sheet at the edge zone; sealing one side of a rail sheet to the first feed sheet, the second feed sheet and the cell sheet; sealing a second side of the rail sheet to the base sheet.

In other aspects, a cell bladder system is provided including a base sheet extending in a first direction and a first set of a plurality of cells arranged in parallel along and on a first side of said base sheet. Each cell formed by a first sheet of material sealed two seals which are spaced apart from each other along the base sheet such that a length measured along the first sheet of material between the two seals is at least 1.5 times longer than the spacing of the two seals along the base sheet. Each of the first plurality of cells connected are together at the base sheet such that each cell of the first set of the plurality of cells is connected to an adjacent cell by the base sheet of the cells, wherein the connection between the base sheets is by sealing together the base sheet between adjacent seals of the adjacent cells. The first set of the plurality of cells includes at least five cells.

In certain aspects a second set of a plurality of cells which are positioned on an opposite side of the base sheet with respect to the first set of the plurality of cells are provided, the second set of the plurality of cells created by two seals between the base sheet and a second sheet, the two seals spaced apart at a distance such that a length measured along the second sheet of material between the two seals of the second set of the plurality of cells is at least 1.5 times longer than the spacing of those seals along the base sheet.

In certain aspects a cell bladder system is provided with a plurality of tubes which are joined together at seals. The seals are provided at approximately a middle plane of the plurality of tubes such that the plurality of tubes when inflated are connected substantially along a middle plane and wherein at least 5 tubes are sealed together in series.

In further aspects, an air mattress is provided including a bladder and a cover surrounding the bladder. When inflated, the mattress has two lengthwise head to toe edges. The cover includes a bottom sheet located between the two edges and sealed to an upper sheet at two locations offset inwards relative to a corresponding one of the two head to toe edges, the two locations defining a fin which allows for securing the air mattress to a support structure via the fin.

In certain aspects a portion of the cell bladder extends between the bottom sheet and the upper sheet at the two locations and is sealed between the bottom sheet and the upper sheet such that the cover is secured to the bladder by the portion. In other aspects the upper sheet includes three sheets of material sealed together along outer edges of a middle one of the three sheets and outer edges of the upper sheet are sealed to the bottom sheet at the two locations.

Other objects of the invention and its particular features and advantages will become more apparent from consideration of the following drawings and accompanying detailed description.

BRIEF DESCRIPTION OF THE DRAWINGS

FIG. 14 shows a side view of the cell structure of FIG. 3-13 in the upright or sit up configuration.

FIG. 15 shows a partial bottom perspective view of the cell structure of FIG. 3-14.

FIG. 16 is a front view of FIG. 15.

DETAILED DESCRIPTION OF THE INVENTION

Figure 1:
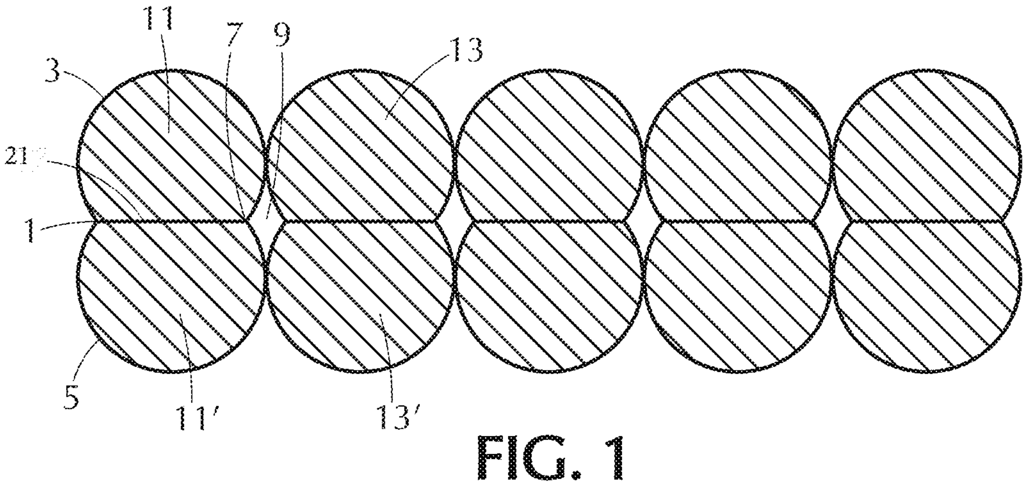
FIG. 1 is a cross section view showing an example of a separate tube system

Referring now to the drawings, wherein like reference numerals designate corresponding structure throughout the views. The following examples are presented to further illustrate and explain the present invention and should not be taken as limiting in any regard.

Figure 2:
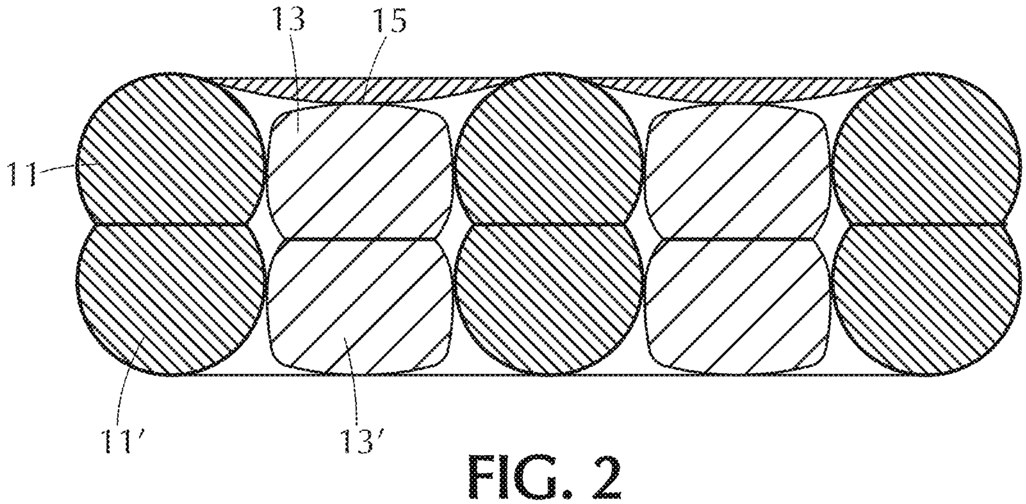
FIG. 2 is shows a cross section view of FIG. 1 showing varying pressure in the cells.

FIGS. 1-2 show an exemplary tube structure. As can be seen, tube 11 is formed by seals 1 and 7 between upper sheet 3 and middle sheet 21 and the bottom/lower tube 11' is formed by seals 1 and 7 between lower sheet 5 and middle sheet 21. Alternately, a single tube can be formed without middle sheet 21 and would then just have one seal to form a circle or alternately be an extruded cylinder. Space 9 is provided between tube 11/11' and tube 13/13'. Tube 13/13' is formed in a similar manner to the adjacent tube. FIG. 2 shows the tube structure of FIG. 1 with lower pressure in tubes 13/13' and higher pressure in tubes 11/11'. As can be seen, the high pressure tubes tend to move towards a cylindrical structure whereas the lower pressure tubes tend to form more of a square shape. As a result surface 15 will tend to undulate or be slightly bumpy, thus causing a variance in contact pressure with surface 15 due to the dimensional change in shape of the mattress. As can also be seen, the lower pressure tubes 13/13' tend to shift the middle down slightly and the shape of space 9 changes as a result.

Figure 3:
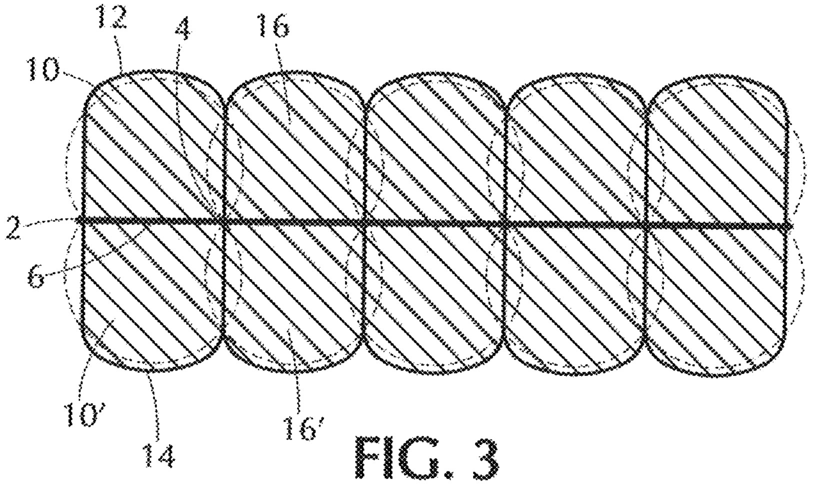
FIG. 3 shows a cross section of a cell structure for a support such as a mattress according to the present invention.
Figure 4:
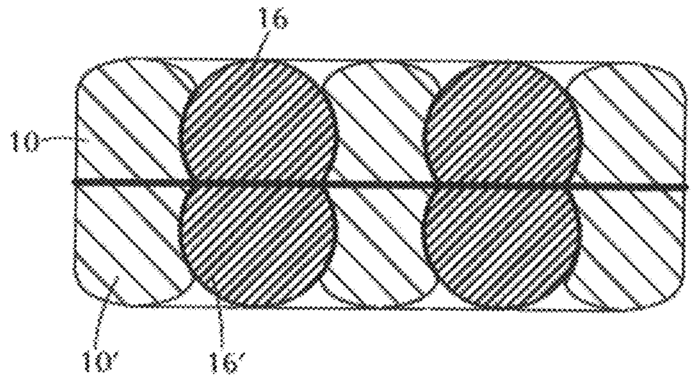
FIGS. 4 and 4A show a cross section of the cell structure of FIG. 3 with varying pressure in the cells.
Figure 4A:
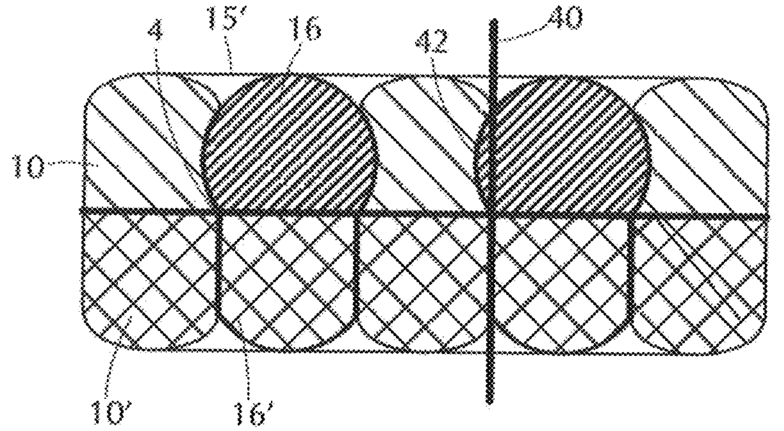

FIG. 3-4A show a cell structure with base sheet 6 preferably being continuous along the length of the cell structure. As can be seen, seals 2 and 4 make up the top 10 and bottom 10' cells in that upper sheet 12 is sealed at 2 and 4 and lower sheet 14 is also sealed at 2 and 4. The adjacent cells 16/16' which are the next cells down the base sheet have a similar structure in that the left seal 4 of cells 16/16' is the right seal of cells 10/10' (from the viewpoint of FIG. 3). It is understood that the right side of FIG. 3 may be the head of the mattress and the left towards the foot with the cells generally extending across the mattress from left to right from the perspective of the user. The dashed lines in FIG. 3 depict the approximate shape of the various cells as pressure varies. For example, FIG. 4 shows cells 16/16' as high pressure and cells 10/10' as low pressure. Since the seal 4 is common to adjacent cells, space 9 of FIG. 1 does not exist. As a result, the higher pressure again tends to make a cylindrical shape (constrained by the base sheet from being a perfect cylinder), and the lower pressure cell 10/10' tends to cave in with the wall of cell 16 pushing to the left of a vertical axis 40 perpendicular the base sheet 6. The result is that area 42 is to the left of axis 40, but when pressure is added to cell 10/10' and the pressure of cells 16/16' are reduced, the alternate configuration would happen in that area 42 would be to the right of axis 40 (see dashed lines in FIG. 3). Since the pressure tends to alternate out of phase for adjacent cells, there is a cooperative back and forth movement of the walls of adjacent cells, depending on the pressure. It is understood that the dashed lines represent maximum/minimum pressure shapes but that there will be an oscillation in pressure in that cell 10/10' will be at their lowest pressure when cell 16/16' is at their highest pressure and the pressure of cell 10/10' will tend to oscillate at one phase (e.g. a sin curve of pressure v. time) and the cell 16/16' will oscillate out of phase (e.g. a cos curve of pressure v. time). The end result is that the tops and bottoms of the cells will generally stay relatively level in that surface 15' will be flatter as compared to that shown in FIG. 1-2. While there may be small gaps to the left and right of the maximum height of the cells, these gaps are comparatively much smaller than the variation in surface height created in FIG. 2. Thus, by providing that adjacent cells share a common seal, the pressure of these adjacent cells can be varied to provide pressure relief and to also inhibit e.g. bed sores. At the same time, this varied pressure will not result in too great of a change in shape of the basic bed surface.

FIG. 4A although similar to FIG. 4 shows a configuration where the bottom cells 10'/16' are inflated with a constant or base pressure. This pressure is typically the same as that of the rails. The upper cells 10/16 will alternate and fluctuate in pressure as described above with the lower cells 10'/16' remaining at constant pressure.

The length from seal 2 to seal 4 measured along the upper 12 sheet is longer than the length between seals 2/4. This length along sheet 12 between the seals 2/4 is preferably 1.75-4 times the length between seals 2/4 as measured along the base sheet 6, more preferably 2-3 times and even more preferably 2.4-2.9 times and most preferably 2.6785 times the length. This ratio determines the loft height of the cell and the mattress. Further, since the cells are made from continuous sheets, the process of making the cells does not require many cuts in that the first seal will be made on the top and bottom, sealing together the upper, lower and base sheets at the appropriate location, the upper and lower sheets are then folded or pleated to "grab" excess material to create the cell loft. The appropriate location of the next seal is then determined based on the above described ratio and the spacing between seals is determined based on the length from the initial seal along the base sheet. These seal locations on the upper, lower and base sheets are then brought together and the three sheets are sealed together. This process repeats over and over until enough cells are created for the appropriate mattress or support length. As such, the base sheet, upper sheet and lower sheet can be set up such that they are only cut at the beginning and end of the mattress, which greatly simplifies the manufacturing process.

It is understood that FIG. 3 shows an example cell configuration where the bottom and top cells both alternate in pressure in that cells 10/10' have one pressure pattern and cells 16/16' have a different pressure pattern (typically out of phase with respect to cells 10/10'). As an alternative, the system can be configured such that the top cells 10/16 etc alternate in pressure and the bottom cells 10'/16' have a constant pressure, which may be the same pressure as that of the rails in the mattress system described in other figures. FIG. 4A shows the bottom cells with a constant pressure and the upper cells alternating.

The base sheet in FIG. 3-4A adjusts the inflated shape of the cell relative to the base sheet in that the base sheet pulls the middle together and generally creates a more oval shaped cell with the oscillating back and forth features where lower pressure cells have a concave outer surface where adjacent cells touch and higher pressure cells are convex in that location. Due to the material which makes the cells being of relatively low elasticity or ability to stretch, the increasing pressure once the cells are fully inflated tends to not cause much change in dimension of the cells. The lower pressure cells then conform to the shape of the higher pressure cells which results in generally a more level surface as compared to cells which are not interconnected as shown in FIGS. 1-2.

Figure 5:
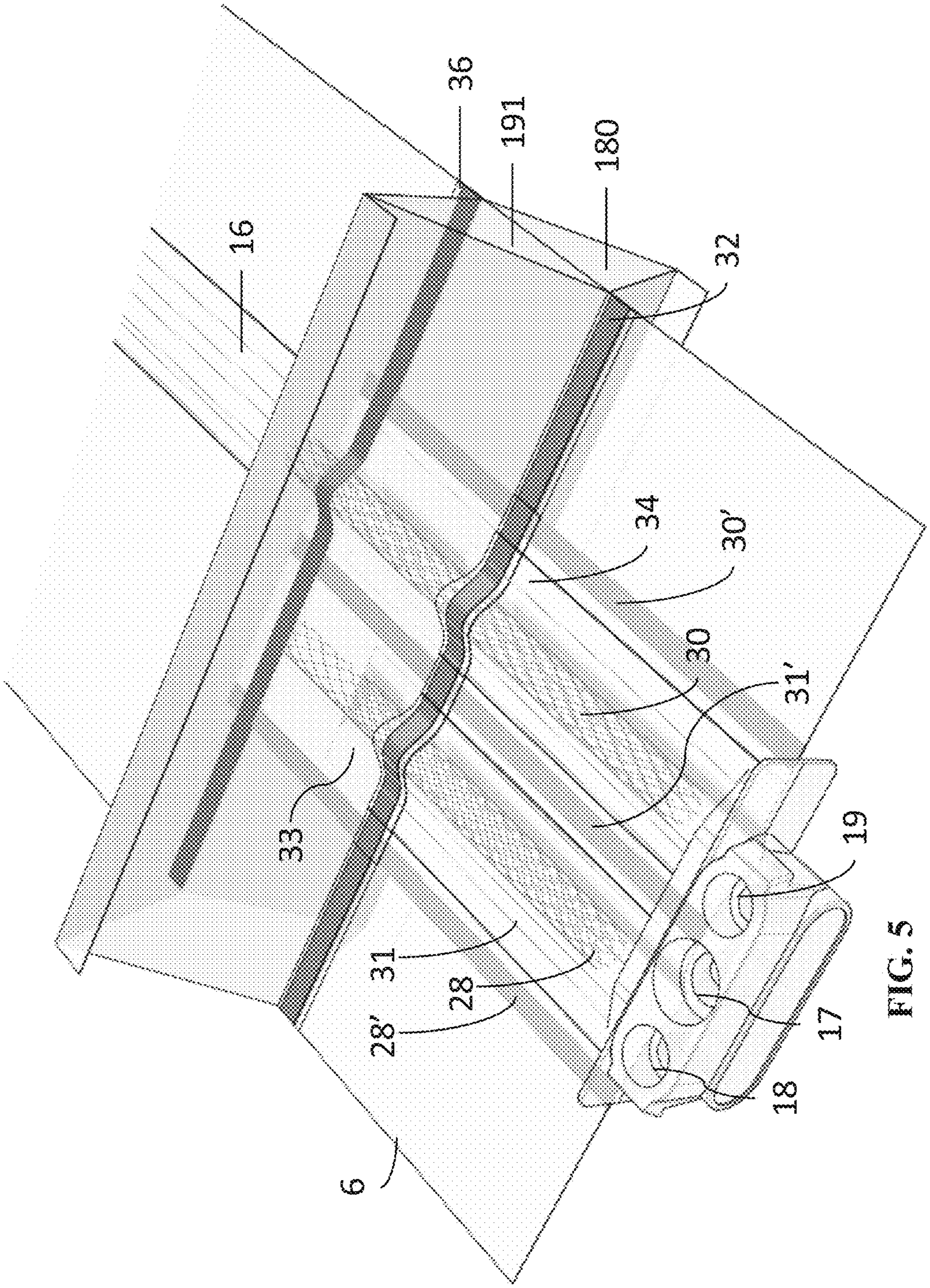
FIG. 5 shows a perspective view of the port system for the cell structure of FIG. 3-4.
Figure 7:
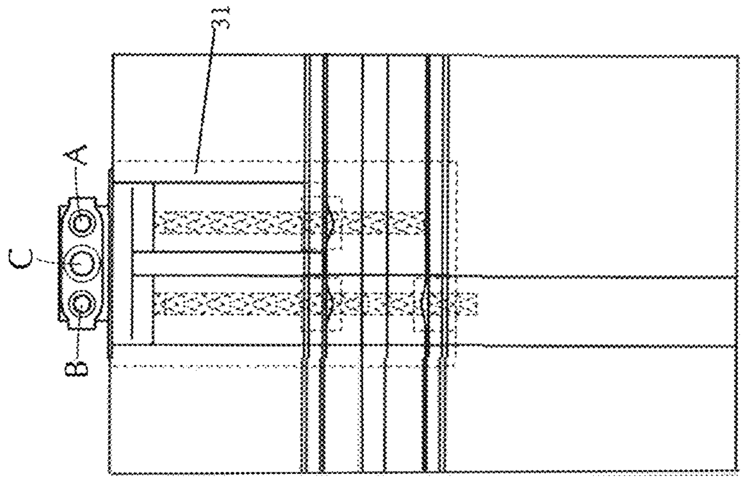
FIG. 7 shows a top view of the port system for the cell structure of FIG. 3-4.

FIGS. 5 and 7 shows an example port feeding system which enables different fluid pressures (and patterns) to be introduced to different portions of the support structure. Referring to FIG. 5, the layering from top to bottom of the view in FIG. 5 (which actually shows the mattress upside down), Base sheet would be above the release sheet 34 (one for each tube), the tubes 30/28 come next, then another release sheet 34 (one for each tube) and then sheet 31. Feed cell 180 although shown facing downwards is actually an upper feed cell for the mattress in the using configuration. Port body 20 includes ports 18, 17 and 19. Typically ports 18 and 19 will be supplied with fluctuating fluid pressure out of phase with respect to each other and port 17 will be supplied with a constant pressure. Port 17 then feeds the rails of the mattress and ports 18/19 feed different groupings of the cells. Pressure port 18' is connected to porous tube 28 which has sheet 31 sealed around it (to the base sheet 6) in order to provide a tube. The porous tube keeps the sheet 31 and sheet 6 separated and allows for easy introduction of fluid therein. Pressure port 19' includes similar structure with porous tube 30 and sheet 31 extends over this tube as well. Seals 28', 30' and 31' isolate the porous tubes 28/30 with their corresponding port 18/19 and pressure port 18'/19' which feeds the alternating cell structure with alternating pressure.

As can be seen, the sheet 31 between seals 28' and 31' ends 33 as it reaches seal 32 such that feed cell 180 is in fluid communication with port 18. Alternately, the sheet 31 can be square and extend all the way to 36 for both porous tubes 28/30 and have a perforation/cut in it near 33 to allow fluid flow into feed cell 180. Sheet 31 between seal 31' and 30' extends past seal 36 and connects with one of the cells, e.g. cell 16 of FIG. 4. On the other side of the base sheet (top of FIG. 5, which is the bottom of the mattress), there is a second feed cell 191 similar to cell 180 running head to toe along the mattress. (See FIG. 6). This cell 191 has perforations along the length of the mattress so as to feed the bottom cross cells with constant pressure of the rail. The opposite side of the mattress also has a cell with perforations 192. One of these perforations will align with cell 16 which will then inflate that feed cell and inflate alternating ones of the cross wise cells (FIG. 3-4*a*) with feed cell 180 inflating the other cross wise cells. Separation sheets 34 (e.g. including Teflon or other release agent) inhibit sheet 31 from sealing to the base sheet 6 when seal 32/36 is created along feed cell 180. Similar sheets are used for seal 36. This ensures that the tubes 28/30 do not melt together and prevent/inhibit flow of fluid where desirable. As can be seen in the top view of FIG. 7, the different length of sheets 31 between different seals 28' and 31' and 31' and 30'. 28" and 30" allow for the ports 18/19 to feed different feed tubes/cells in order to provide alternating pressure along the mattress.

Figure 6A:
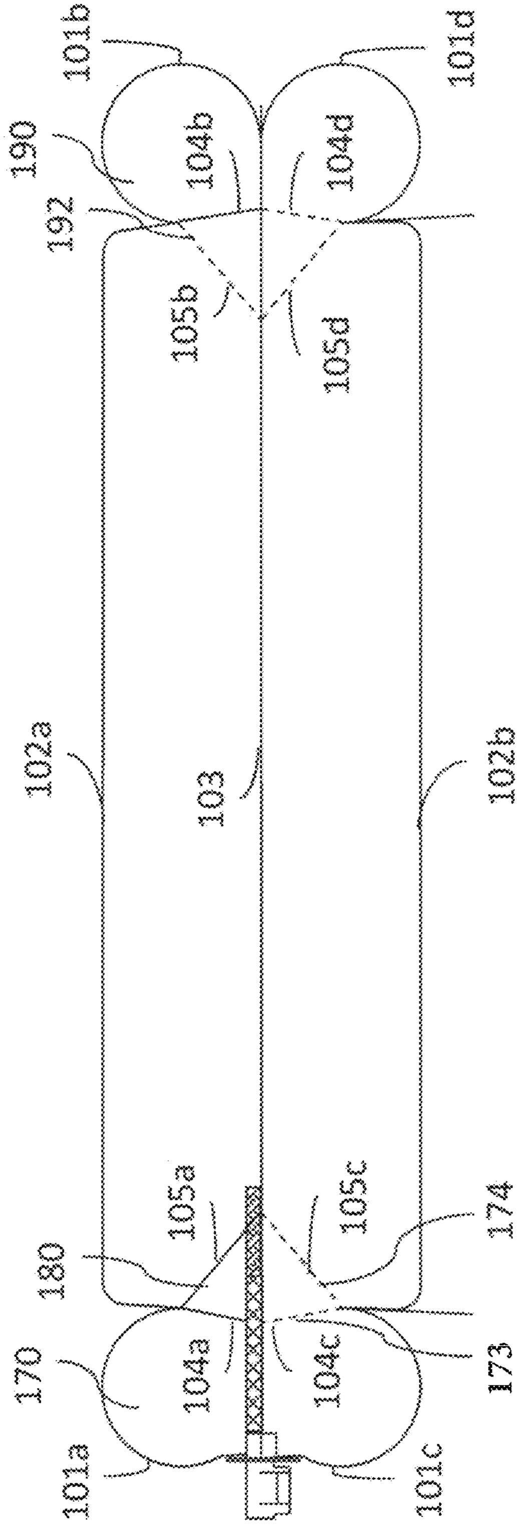
FIG. 6A-B shows a cross section view of the port system for the cell structure of FIG. 3-4 along with the flow path of different fluid pressures.
Figure 6B:
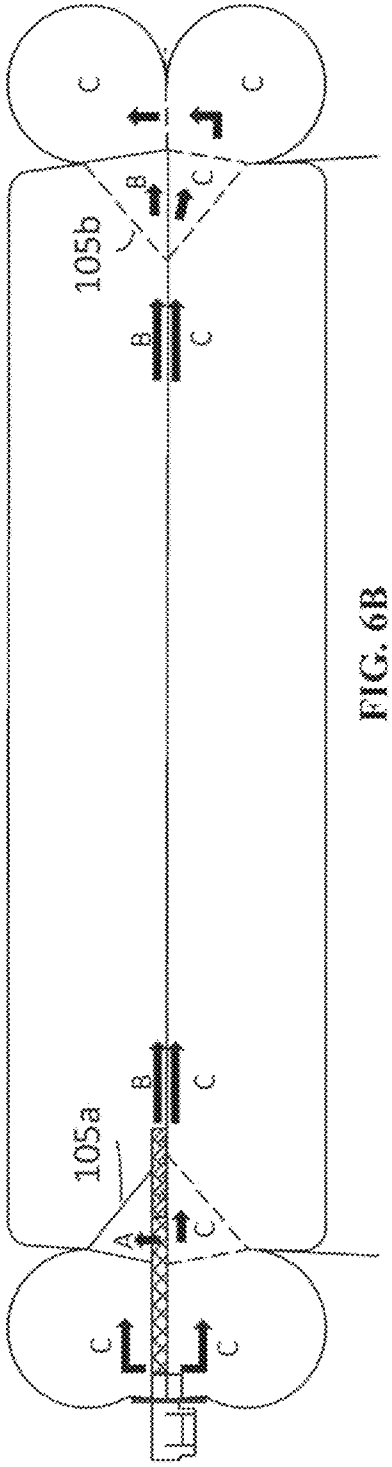

In the cross section shown at FIG. 6A-B, the cross section is taken through a cell in communication with port 19. If the cross section were taken at an adjacent cell, there would be no perforations 192 in the feed cell and perforations would be provided in cell 180, but aligned with a different grouping of cells as opposed to those aligned with perforations 192.

Port 17 feeds the rail 170 and the mirrored rail below rail 170. Feed cell 191 is positioned above the base sheet as shown (which is the bottom of the mattress) and this cell 191 is opposite and roughly a mirror image of feed cell 180 (but with different perforations). This feed cell 191 has additional perforations 173/174 which communicate with each lower cell (10'/16'), as opposed to alternating cells with the upper feed cells 180 on one side and the opposite feed cell (shown in FIG. 6A with perforations 192). In this manner, the rail pressure fed through port 17 is constant for the rails and all cells of the bottom of the mattress. By varying the perforations in the sheets 104/105 (*a-d*), the distribution of pressures provided through the ports 17-19 can be changed. In preferred embodiments, the feed cell 180 (and other generally triangular shaped feed cells) are formed from two flat sheets of material sealed to the base sheet in a spaced relationship at one edge and sealed together at another edge. FIG. 7 shows a top view of FIG. 5 but with the seal 28' being shorter than seal 31' in order to provide for fluid communication to feed cell 180.

In FIG. 6A 101(*a-d*) correspond to the sheets of film which make the rail or rail cell. Sheets 104 (*a-d*) correspond to outer feed tube sheets and sheets 105 (*a-d*) correspond to inner feed tube sheets. The base/core sheet 103 is the same sheet as sheet 6 shown in other figures. Sheets 102 (*a-b*) or pleat sheets correspond to the upper and lower 12/14 sheets in other figures. Each intersection of sheets corresponds to a seal. While perforations are shown in certain of the feed tube sheets 104/105, these perforations will typically vary in their positioning along the length of the feed tube, depending on where the cross section is taken and where flow is desired.

FIG. 6B depicts further detail on how flow is isolated to different cells to provide for varying pressure in certain cells and constant pressure in others. C cells are fed by the center port 17 which is provided to inflate the rails. A cells are fed by port 18 and B cells by port 19. The tube shown in FIG. 5 for port 18 extends into the upper feed tube created by sheets 104*a* and 105*a* sealed to the base sheet 103. That feed tube includes punches along its length which correspond to alternating ones of the cells (e.g. cell 16). Port 19 passes through the rail and feed tube in a sealed manner and opens up into one of the cross cells (e.g. cell 10). Pressure then follows arrows B and passes through feed tube sheet 105*b* since perforations align with cell 10 in this example. The right side feed tube (105*b*, 104*b*, 103) includes perforations along its length which alternate between open to a cell and not open to a cell, thus, the even cells ($2^{nd}$, $4^{th}$, $6^{th}$ etc.) will be in communication with one feed tube whereas odd cells ($1^{st}$, $3^{rd}$, $5^{th}$ etc.) will be in communication with the other feed tube since the perforations line up in alternating order with the cross cells 10/16 to provide for alternating pressure between adjacent cells. For example, if the cross section were taken through odd cells instead of even cells, sheet 105*a* would have perforations and sheet 105*b* would not have perforations. The lower portion of the mattress includes perforations for both odd and even cells so that the rails and bottom cells are all inflated with constant pressure. However, by varying the location of the perforations, the groupings of cells and which cells alternate in pressure can be modified. FIG. 6B shows the middle port 17 provides pressure C which is typically a constant pressure. This C pressure travels into the rails near the port and then through the bottom feed cell through perforations 173 and 174. In the embodiment shown, these perforations then feed the lower cells 10'/16' with constant pressure and the C pressure travels across the bottom of the mattress, through the lower and opposite feed cell and into the rails on the opposite side of the port. Sheet 104*b* is provided without perforations to isolate C and B pressures. A pressure is fed through port 18 which enters feed cell 180 which has alternating perforations along its length to alternately communicate with certain ones of the cells (e.g. cell 10 and then alternate cells along the mattress length). This communication is accomplished by the perforation in sheet 31 or the varied seal 28' length (FIG. 7). As shown in FIG. 5, port 19 communicates with cell 16 and supplies B pressure which enters through perforations in sheet 105*b* to then supply B pressure head to toe along that feed cell. The feed upper feed cell on the opposite side of the port also has alternating perforations which alternate cells such that all cells are supplied with either A or B pressures (which will fluctuate out of phase as described herein).

Figure 9:
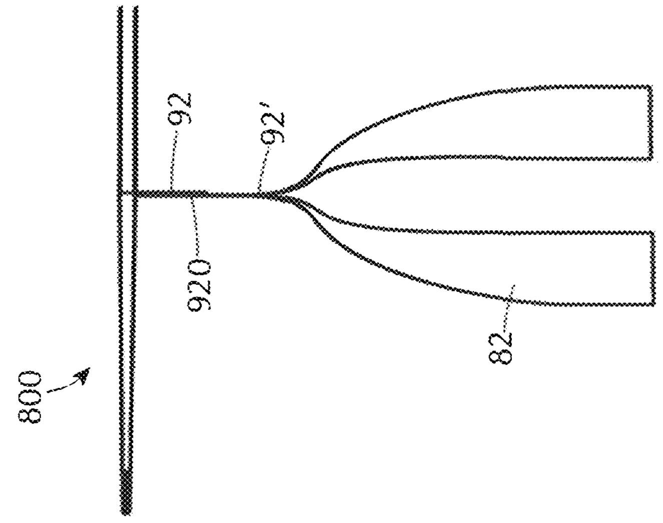
FIG. 9 shows a side view of the attachment system of FIG. 8.
Figure 8:
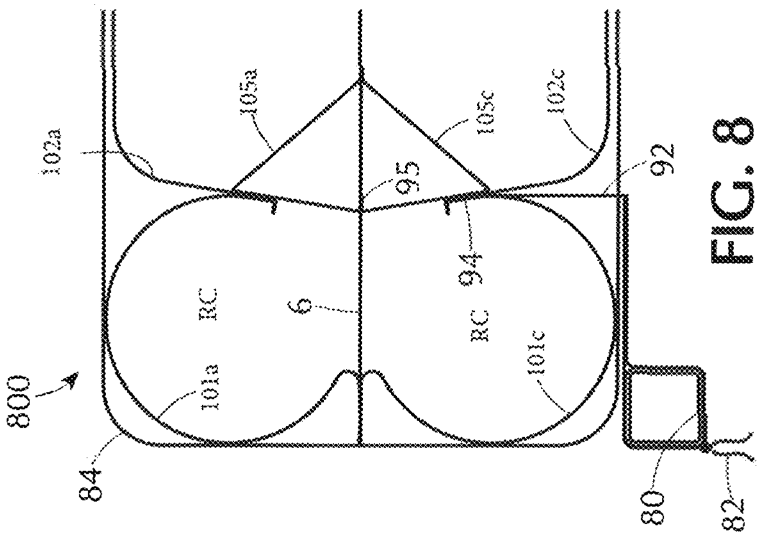
FIG. 8 shows a partial front view of the cell structure of FIG. 3-7 with details on the attachment system.
Figure 11:
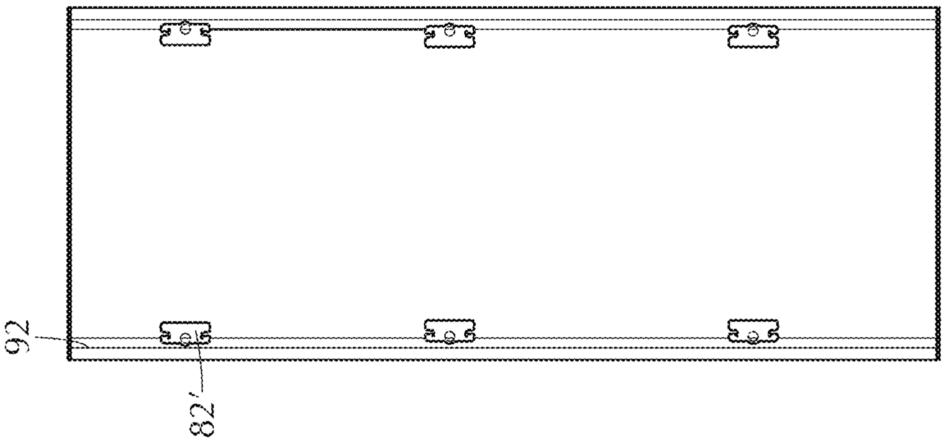
FIG. 11 shows an alternate embodiment of the attachment system of FIG. 9.
Figure 10:
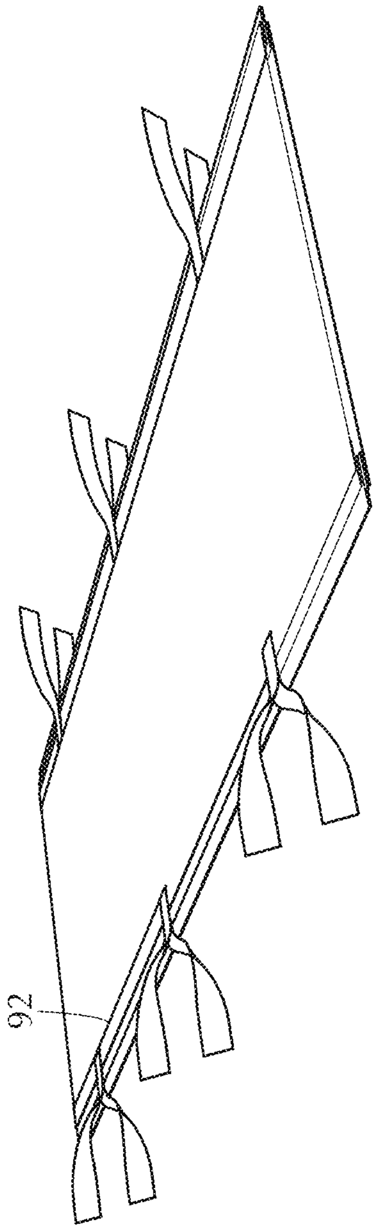
FIG. 10 shows the cell structure of FIG. 3-9 in the deflated configuration.

Referring to FIG. 8, the attachment system is shown with 80 representing a support frame, for example a hospital bed frame. The mattress 800 includes the cell structure of FIGS. 3-7 with rails RC positioned between the cell structures of FIG. 3. The cell structures extend from left to right whereas the rail RC extends from head to toe. The mattress 800 is provided with cover 84 which encompasses the inflatable structure and fins 92 are provided which seal 94 to sheets 101*c*, 102*c*, 105*c*, 104*c*. In this manner, the fin 92 is secured to tie 92' with ends 82 which are tied around frame 80. The end result is that ties are spaced down the length of the mattress (FIG. 10), but are off set from the outer edge. Where the fin 92 exits the cover, two edges which are located on the bottom of the cover seal to either side of fin 92 with tie 82 sealed 920 at joint 92' (See FIG. 9). With the ties offset inwards, a fitted sheet, blankets or other bedding can now be tucked under the mattress between the mattress and frame like can be done with a conventional mattress. At the same time, the mattress is well secured to the frame 80 to avoid sliding as the inflatable mattress 800 tends to be lighter weight and more apt to sliding around as compared to a heavier traditional mattress found at home. FIG. 11 shows an alternate clip 82' attached to fin 92. This clip 82' is designed to interface with existing mating clips/structure found on the frame 80 in certain support frame models. Seal 95 shows where sheet 104*c* seals to the base sheet 6 or BS.

Figure 12:
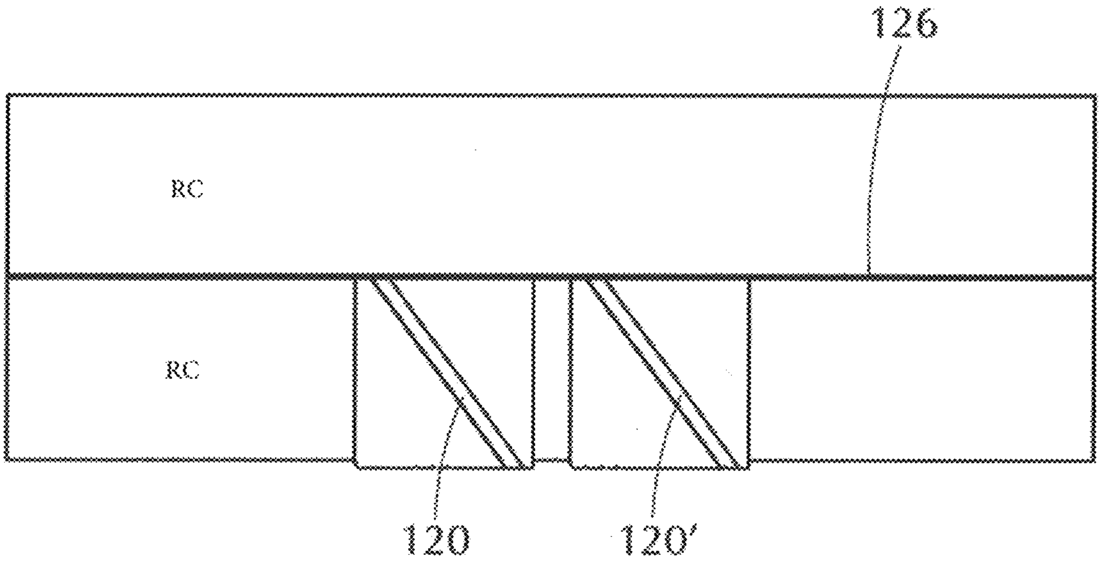
FIG. 12 shows a side view of one detail of the cell structure of FIG. 3-11 and FIG. 12A shows a side view of the same structure on both upper and lower rails.
Figure 12A:
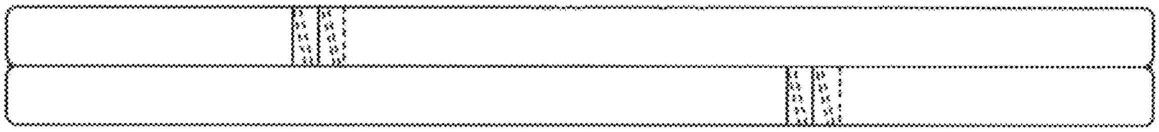
Figure 13:
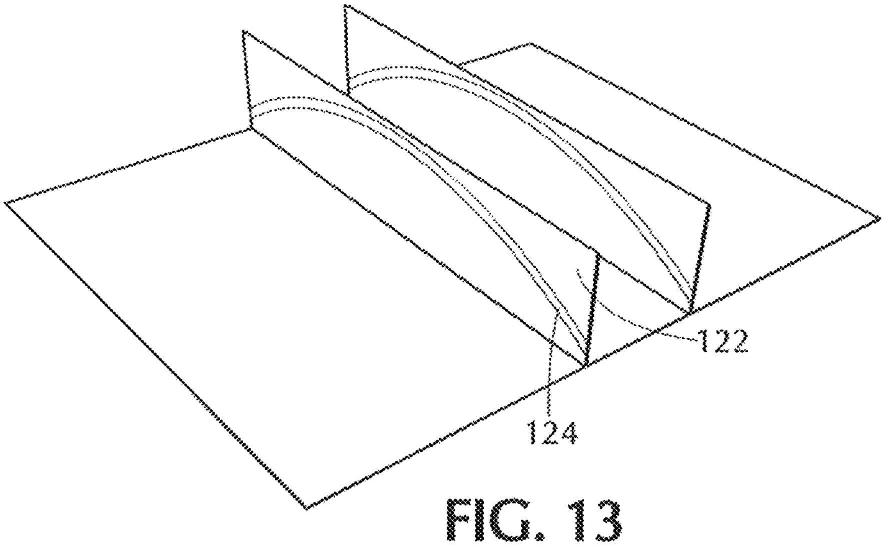
FIG. 13 shows a perspective view of the seal pattern of FIG. 12.

Hospital and at home care beds along with other articulating bed frames are sometimes desirable. Especially in the medical setting where patients may have difficulty sitting up or moving around. FIG. 12 shows the rails RC (upper and lower) with the articulating expansion joints 120/120' which are found in the lower rail RC. These joints 120/120' expand and retract depending on the configuration of the support frame 80 in that FIG. 12 shows the flat configuration and FIG. 14 shows a more upright configuration. It is understood that these joints 120/120' can also be found in the upper rail RC in the area where there is articulation of the foot end of the bed frame to make a flattened and sideways "Z" shaped bed configuration (See FIG. 12A showing joints on the top and bottom of the rails). FIG. 13 shows how the pleats 122 are created and then a curved seal 124 is imparted across the pleat. The pleat 122 is created by folding/grabbing part of the flat sheet so the outer surface faces itself along the pleat and then a curved seal 124 is imparted. Since the edges of the sheet are sealed to each other 126 to create cylinder shape (FIG. 15-16), the curved seal 124 allows the pleat to be shaped so that the maximum articulation is the same across the entire pleat in that the shape of the seal matches the curve/radius RA of the cylinder once the rail RC is inflated. FIG. 16 does not show the base sheet and it is understood that this is optionally included. As shown in FIG. 14, the upright configuration allows joint 120 to expand to the curved seal 124.

Figure 17:
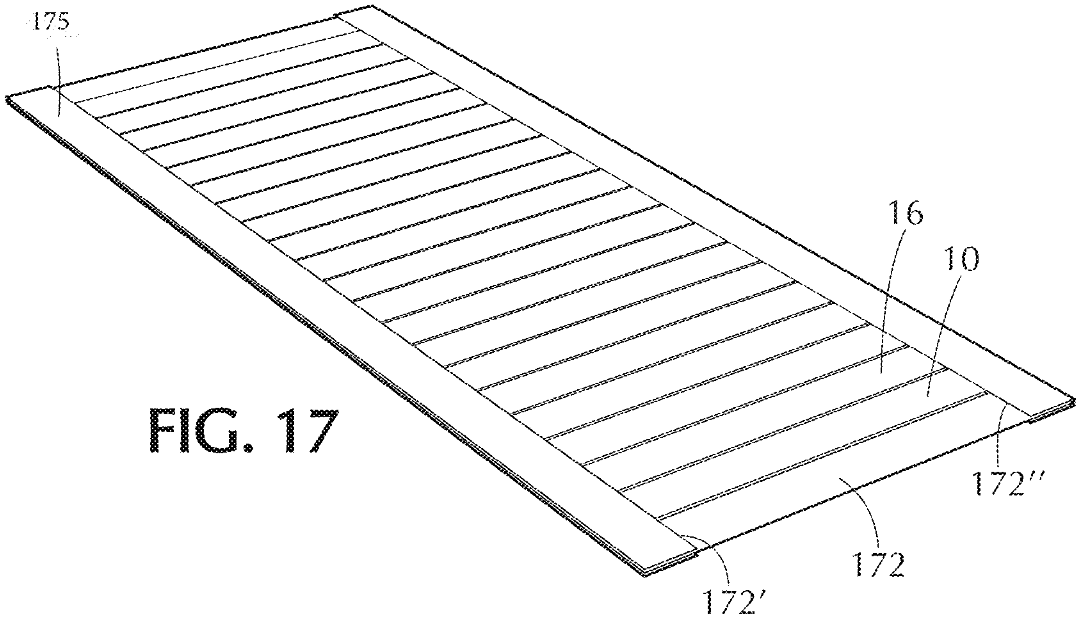
FIG. 17 shows a perspective view of the cell structure of FIG. 3-16 in the deflated configuration.
Figure 18:
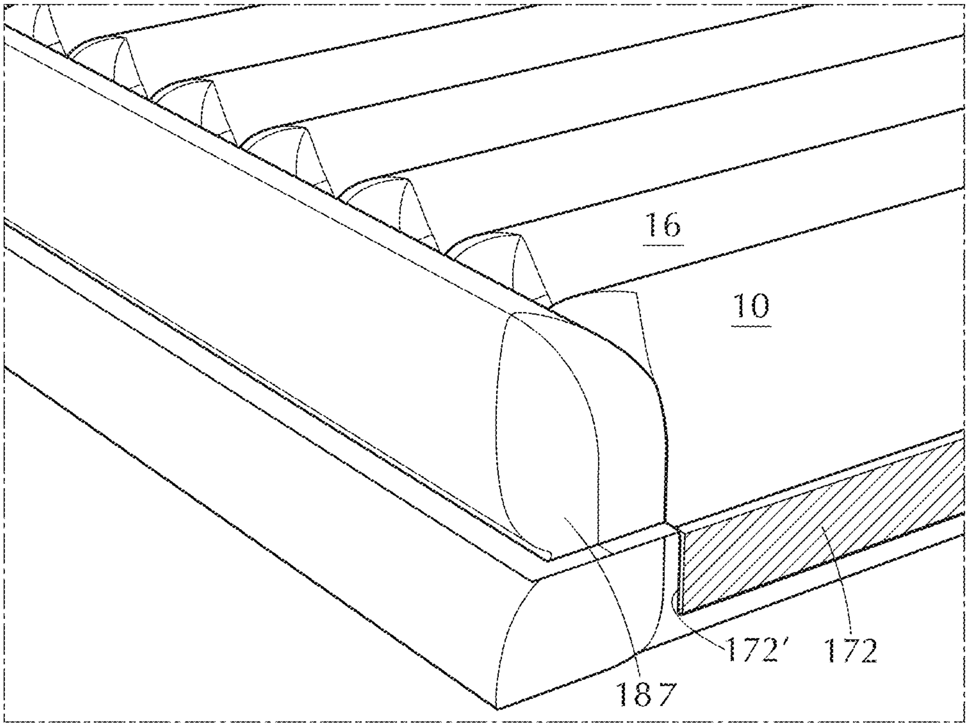
FIG. 18 shows a partial front perspective view of FIG. 17 in the inflated configuration.
Figure 19:
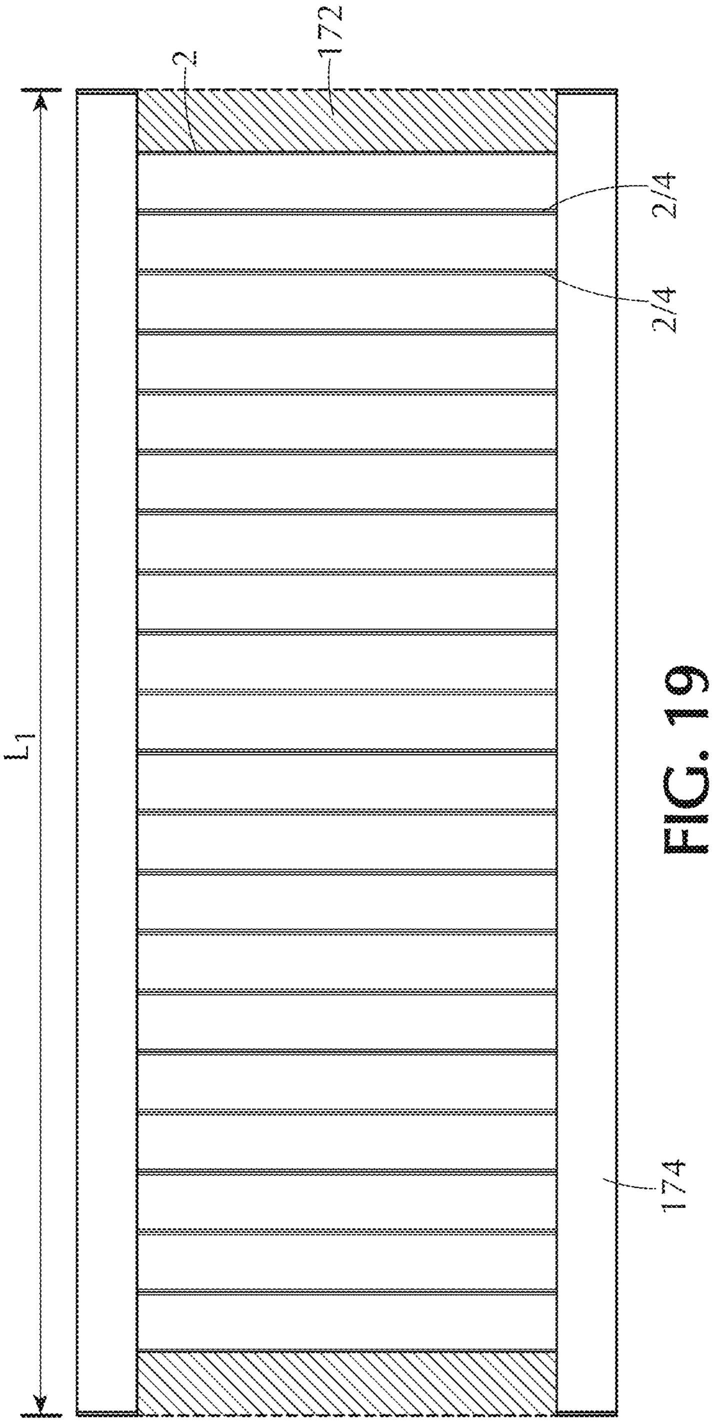
FIG. 19 is a top view of FIG. 17.
Figure 20:
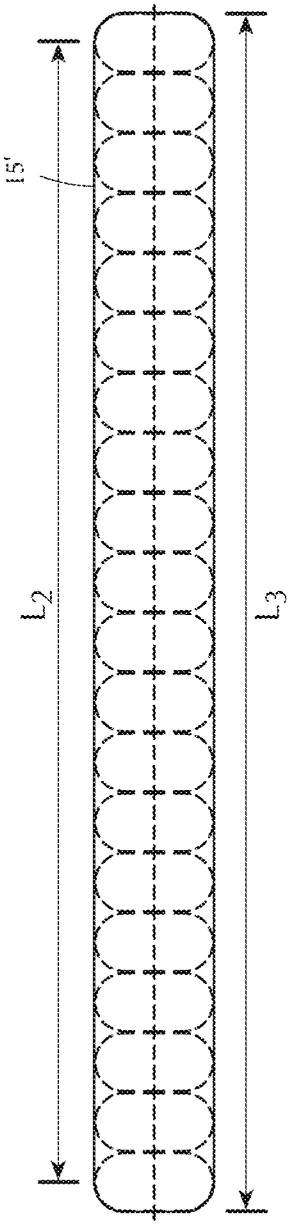
FIG. 20 is a side view of FIG. 17 in the inflated configuration.

FIGS. 17 and 19 shows the mattress 800 in the uninflated configuration with rail cell RC (175) having length L1, but in the inflated configuration (FIG. 18, 20), the length of the rail reduces (L3) and sleeping surface 170 (15') is provided. This is because the end 187 tends to contract as it inflates because some of the length is now creating vertical loft. The result is that the base sheet includes a longer portion 172 which is found between the top and bottom rails RC at the end 187 but does not have cells sealed around it and is provided as excess 172. In certain embodiments, this excess base sheet is curt 172'/172" to allow for this length retraction due to loft creation. This excess is provided on both ends of the mattress. In preferred embodiment L1 is 88.45 inches, L2 is 76 inches and L3 is 80 inches. The difference in L1 and L2 is a function of the loft height of the mattress which in the preferred embodiment is 6-12 inches, more preferably 7-10 inches and even more preferably 7-9 inches and most preferably about 8 inches. L1 will typically be between 70-95 inches with L3 typically about 8 inches less (for an 8 inch loft height). Most mattress applications are in the 70-95 inch range, however shorter mattresses, e.g. for children can be made as well. Typically L3=L1−Y %×Loft height with Y being rough 90-125%. So with a loft height of 8 inches, 8.45 inches is added to the rail length to make L1 roughly 8.45 inches (uninflated) longer than the inflated length of 80 inches. The mattress structure could also be an overlay to existing mattresses or similar to a "topper" with a loft height of around 1-5 inches. With the lower loft height, the difference in rail length to useable cell length varies accordingly. It is understood that dimensions herein may be about or approximate the values stated due to varied expansion of films and varied pressure. In one aspect, the pressure profile for the steady state condition of the A and B cavity looks like two sinusoidal waves that are 180 degrees out of phase. The amplitudes of which is about 0.25 psi and the wavelengths are 12 minutes (thus 6 minute cycle alternations). The profile for the C cavity when steady state is reached is a constant value of about 0.6 psi. However, these values may change for different weights of patients. The typical ranges of these parameters are: (0-0.5) psi for cavities A and B, (0-2) psi for cavity C, and (0-12) minutes for the cycle alternation. Additionally, the pressure profiles may not be simply alternating. For example, pulsating pressure may be preferable, and static/constant pressure may be used in the cells not be needed for treatment of e.g. pressure ulcers, but infectious disease control would still be enhanced through a single use patient mattress with constant pressure and manufacturing variances. Thus, the difference in inflated and uninflated length of the rails (as measured along the middle) is approximately equal to 1.5-3 times the loft height, more preferably 1.75-2.5 times and most preferably about 2 times the loft height. As can be seen in FIG. 19, seal 2 and seals 2/4 are shared along the length of the mattress to define the cells.

Figure 23:
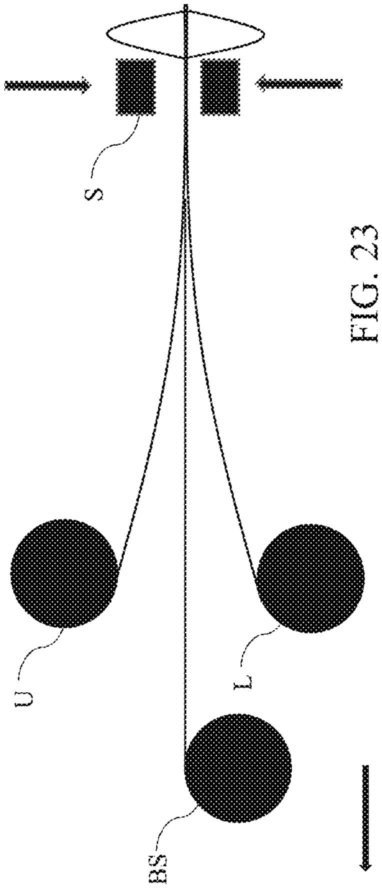
FIGS. 21-25 show an example manufacturing process for the cell structure and mattress of the previous figures.
Figure 21:
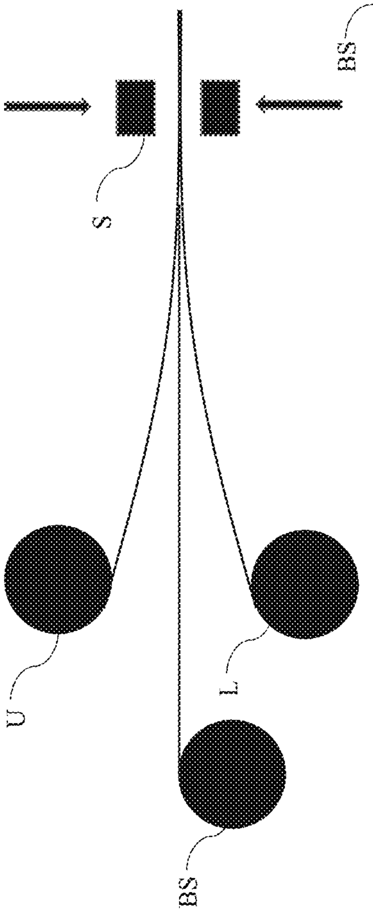
Figure 22:
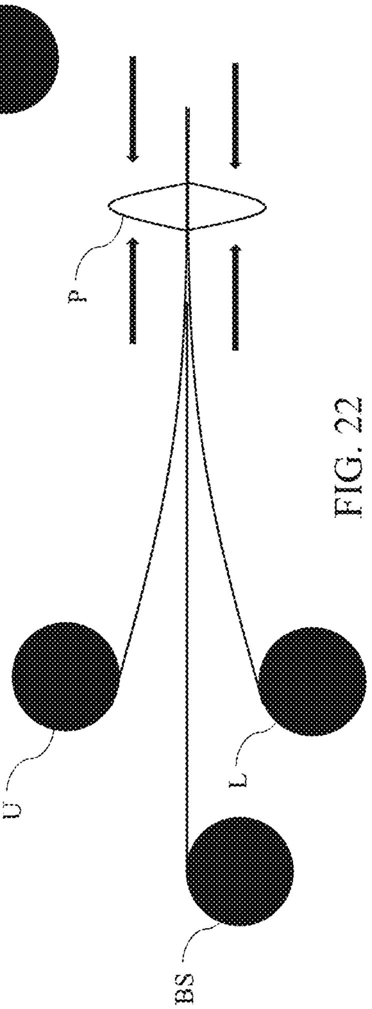

Referring to FIG. 21-23, an example process of making the cells is shown. The upper roll, base roll and lower rolls are brought together to seal S as shown in FIG. 21. This seal may be any acceptable sealing method for plastic films, particularly thermoplastic films. It is also contemplated that gluing or other appropriate bonding can be utilized as an alternative to create a seal. The base sheet BS will typically be wider than the upper U and lower L sheets since the base sheet will also bond to other sheets to create the rail and secondary rail structures shown in the previous figures. In FIG. 22, the upper and lower sheets are pleated/folded together. The height of the fold is twice the distance of the upper or lower cell perimeter along the sheet U or L (not including the length between seals). This fold may be made by suction cups grabbing the upper U and lower L sheets while the base sheet BS remains tight. The seal created in FIG. 21 and the fold/pleat P is moved to the right in as shown in FIG. 23 and another seal S is created on the other side of the pleat P at the pre-determined distance between seals so that the appropriate loft height is generated. The process of FIGS. 22 and 23 repeats over and over such that all upper cells are created from the seals and the upper and base rolls and the lower cells are created from the seals and the lower and base rolls. Along the length of the cell structure, additional sheets are sealed to the base sheet to create the rail and second rails.

Figure 24:
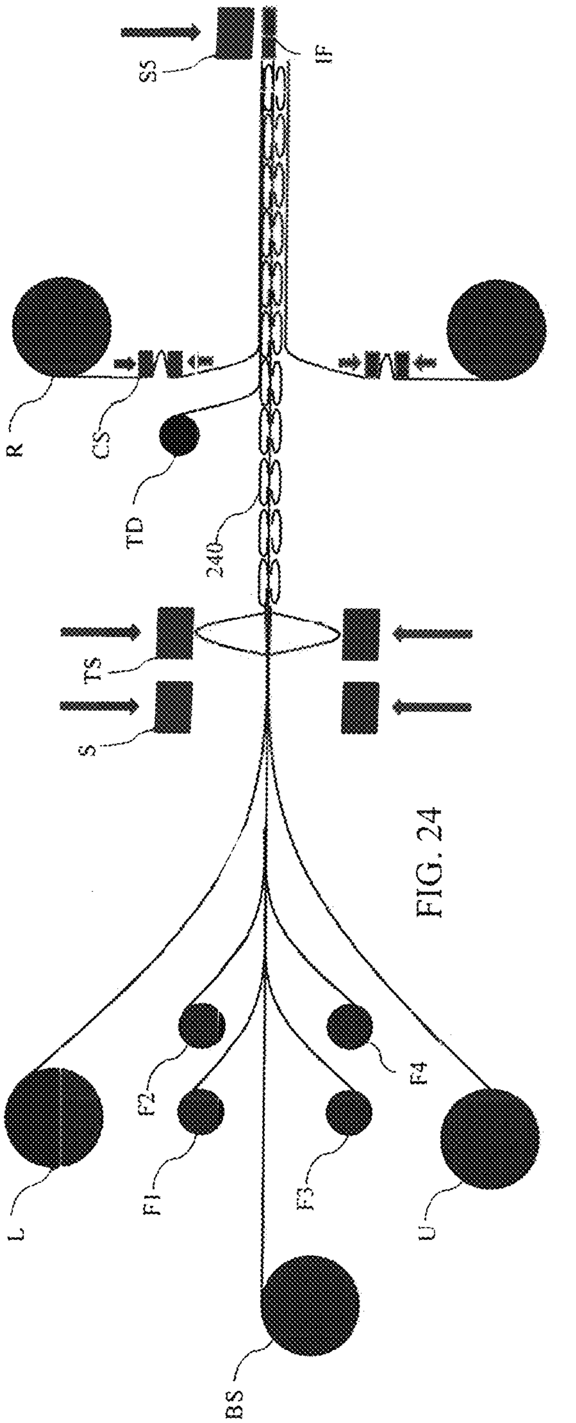

FIG. 24 (flipped upside down relative to FIGS. 21-23) shows additional detail on the manufacturing process, now including feed sheets F1-F4. The opposite side of the assembly machine has four more feed sheet rollers, two on top, two on bottom, but which operate in substantially the identical way as to F1-F4, but on the opposite side of the base sheet. The two upper feed sheets F1, F2 are sealed to the base sheet along the length of the base sheet with the seal of F1 to the base sheet BS spaced from the seal between F2 and the base sheet BS. Eventually, the other edges of these two sheets (which preferably align) will be sealed together to make the triangle shape shown in in e.g. FIG. 6A-B for the feed tube. The feed sheets F1 and F2 are punched/perforated in appropriate locations, depending on the desired fluid communication, with feed tubes for the bottom of the mattress perforated in alignment with every cell ($1^{st}$, $2^{nd}$, $3^{rd}$ etc). The feed sheets which make up the upper feed tube for the top of the mattress will be punched differently, particularly, F1 is typically not punched (104 series of sheets) and F2 is punched (105 series of sheets). The punching is in the pattern of $1^{st}$, $3^{rd}$, $5^{th}$ etc (odd cells) or $2^{nd}$, $4^{th}$, $6^{th}$ etc (even cells). For ease of depiction, the sealing device for F1 to BS and F2 to BS is not shown, but it would be located generally where these sheets first meet and the punch would typically happen immediately before or after the seal location. Normally, F2 is wider than F1. The upper sheet L is then sealed as shown in FIG. 21-23 and the excess length of the cells (width across the mattress) is tacked in place in the loop 240 configuration at the tack seal TS to create these loops. The seal S generally goes across most of the base sheet, however in an edge zone of the base sheet which is typically outwards of the seal between F2 and BS, an isolation bar separates F1 and BS from F2 and L so that a seal is made between F2 and L in a cross wise direction as an extension of the seal S. At this stage, the perforation in F2 has seals around it on three sides. Next the tie down sheet TD and rail sheet R are aligned with the outer edge of F1 and F2 and then the isolation bar IF separates L, F1, F2, R and TD from the base sheet BS and a seal (lengthwise direction) is created between L, F1, F2, R and TD. This seal completes the square pattern seal that generally is located around the perforations in F2 to allow fluid communication between feed tubes and the cells which extend across the mattress. Stated another way, this seal between L, F1, F2 and R makes the fourth side of the seal around the perforations and also closes the edges of the sheets F1 and F2 which were not already sealed to the base sheet BS. A similar process with isolation bars and seals is accomplished with respect to the other side of the base sheet BS but with no tie down fin TD and U replaced for L and F3 and F4 replacing F1 and F2. The upper of the two feed sheets on the upper side (105*a* and *b*) includes appropriately spaced perforations which once sealed generally align inside loop 240. The rail sheet R in FIG. 24 is introduced and CS provides the curved seal (FIG. 12-13) for the articulating joints in the rails, typically one or two joints along the top and bottom of the rail. The rail sheet R is sealed to the base sheet BS along the lengthwise direction of the base sheet (left to right in FIG. 24), which is generally the head to toe direction of the mattress. This creates the generally cylindrical configuration of the rail (once inflated). A seal is also created around the port as shown in FIG. 28.

Figure 25:
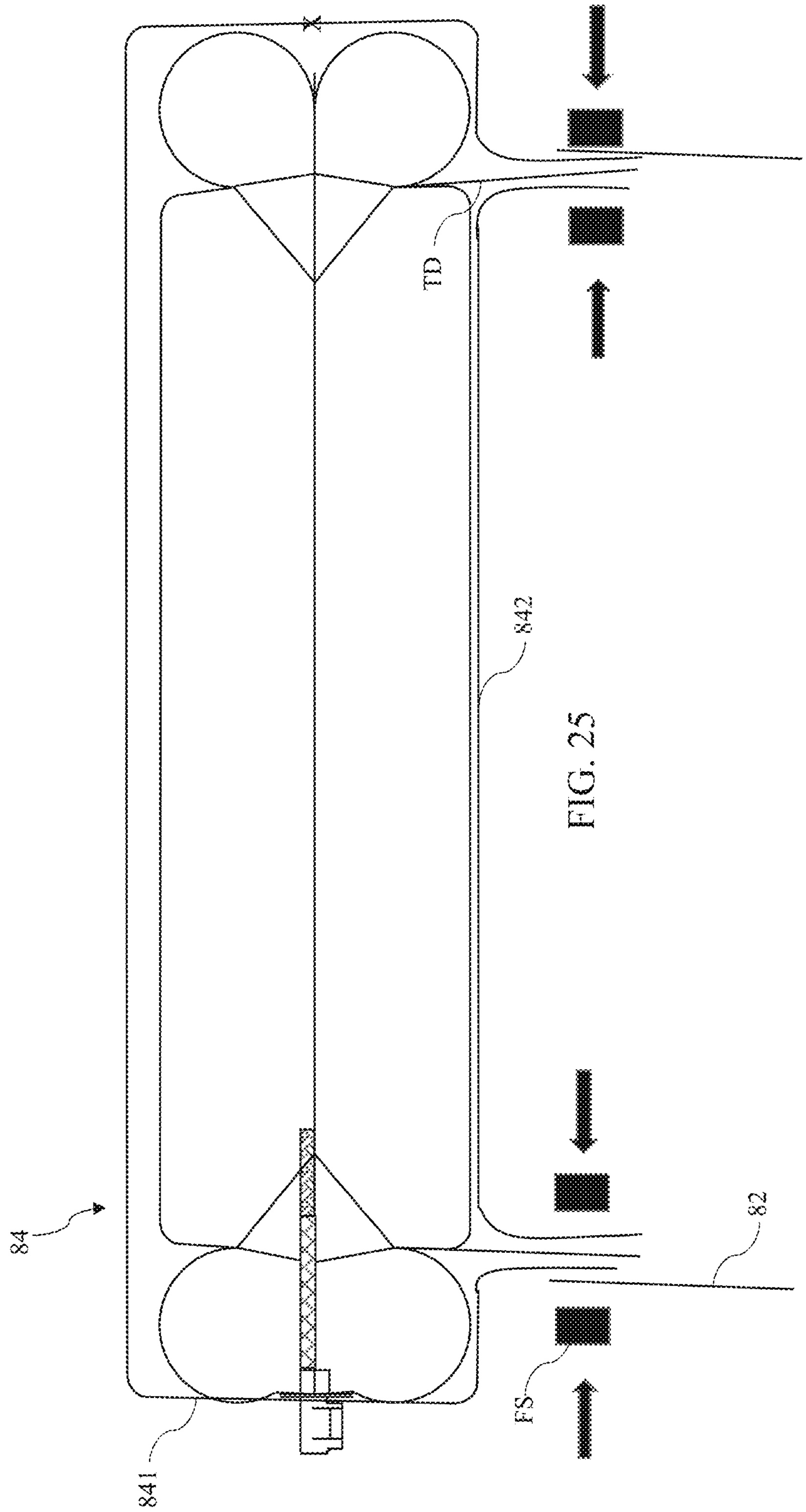

FIG. 25 shows additional detail on how the tie down fin TD or 92 is attached to the cover and the tie down strap 82 or clip 82'. As can be seen the cover 84 is made from at least two sheets of material 841 and 842. Fin seals FS are created to seal together the three layers of TD and 841 and 842. In certain aspects, the tie down fin TD is not used and the cover is made with sheets 841 and 842 sealed together and the tie down strap 82 sealed thereto. In certain aspects, the cover is made from three sheets with the top sheet and bottom (two sheets) sealed together at the "X" on one side and at the equivalent location on the opposite side—about level with the base sheet and the port. This mattress cover may utilize the materials and features shown and described in US2018/0279798 of inventors Kevin P Conway, Stacey duBell Mileti and Robert J. Mileti, the content of which is incorporated by reference herein. Such a three piece mattress cover may have the non-woven polyolefin film on top, sealed to a less expensive film at X and on the opposite side along the base sheet generally level with the port. The middle sheet 842 would then seal at FS to close the cover and also seal to fin 82 and tie down 82.

It is understood that the sheets used herein are in some preferred embodiments thermoplastic films, sealed together using any acceptable heat sealing technique or bonding technique.

The cell structure of FIG. 3-4*a* although shown as part of the overall mattress and feed structure (FIG. 5-9) does not necessarily need to utilize the feed structure with the feed cells described herein. As an alternate option, the cells in FIGS. 3-4*a* can be connected via plumbing lines individually which is more common in prior art mattresses employing the separate tube structure which are later connected to feed tubes. The cell structure of FIG. 3-4*a* provides improved support and cushioning performance in that the cells are connected by the base sheet and share common seals to minimize/remove spacing between cells.

Figure 27:
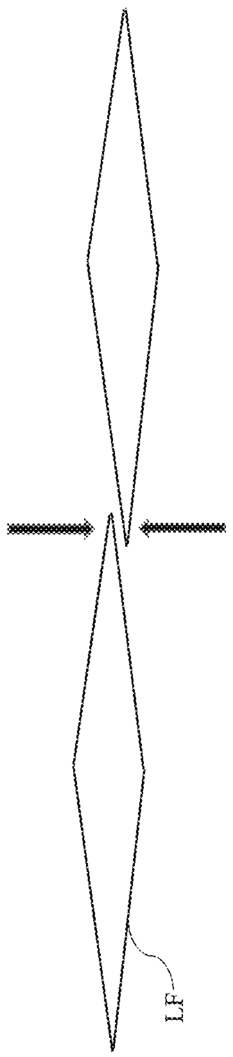
FIGS. 26-27 and 27A show two alternate cell constructions which can be utilized instead of the ones shown in FIGS. 3-4A.
Figure 27A:
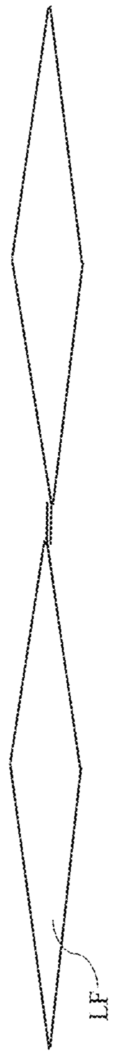
Figure 26:
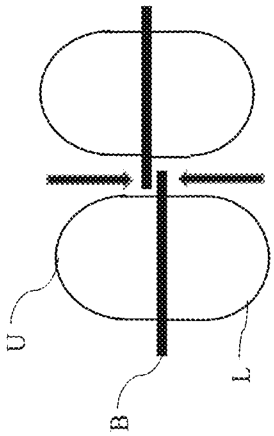
Figure 28D:
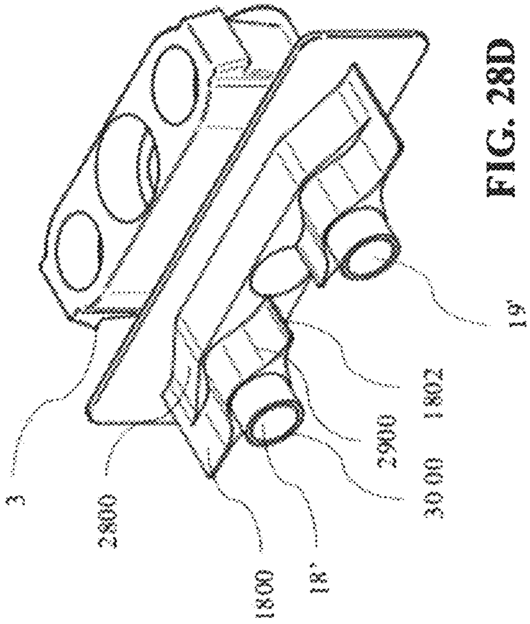
FIGS. 28A-D respectively show side, front, top and perspective views of the port.
Figure 28C:
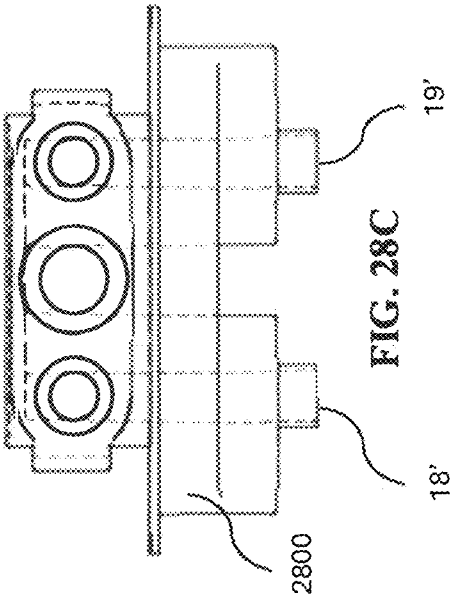
Figure 28B:
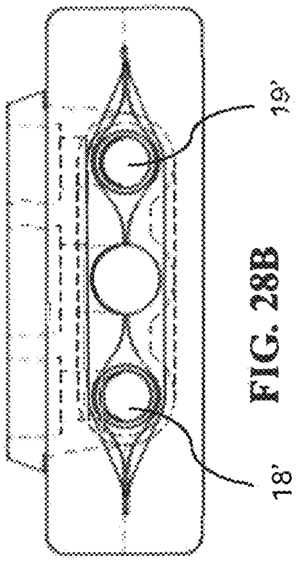
Figure 28A:
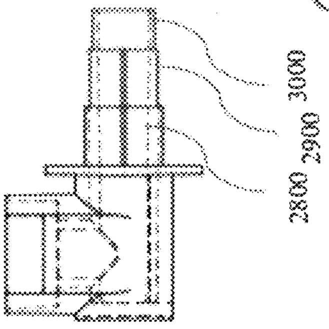

In addition, the cells may be constructed in alternate manners as shown in FIGS. 26-27. FIG. 26 shows a similar base, upper and lower sheet configuration, however the cells are individually formed/sealed to the base sheet and then the base sheets are sealed together (at the arrows). Due to the cells being interconnected along their middle, the variations in the surface are minimized as compared to FIG. 1-2. FIG. 27 shows another variant where lay flat tubing LF is utilized. This tubing generally comes as an extruded film which forms a continuous loop but generally lays flat until inflated. The edges are sealed together where the arrows are located in successive parallel cells. In this manner, once the cells are inflated, the middle plane generally aligns like the base sheet causes the cells to align in the other examples. The plane is not perfectly centered because as can be seen, the cells are layered on top, so they do not align perfectly and further manufacturing tolerances can result in some variation, but generally, half the tube circumference is above and half the tube circumference below the seal. This creates an interconnected cell structure which like FIG. 26 and FIGS. 3-4A can mitigate or reduce the surface fluctuations as compared to the disconnected tubes in FIGS. 1-2. Although only two cell components are shown in FIG. 26-27 it is understood that multiple cells would be connected in a similar manner on either end in series, typically more than 5, and preferably more than 10 and even more preferably more than 15 cell components arranged in series and sealed together generally at their middle.

FIGS. 28A-D show additional details on the port system. Surfaces 2800, 2900, 3000 are provided for sealing different sheets of material to the port to create the fluid isolation between different cell groupings. Surface 2800 is sealed to the outer edge of the rail sheet, to the cover and to the base sheet. The base sheet is cut away at the central pressure port so that this port communicates with the top and bottom rails, surface 2900 is sealed to the base sheet and also to the sheets 28" and 30" in order to create the passageways of different lengths to either go into one feed cell or all the way through that feed cell to feed a cell (extending across) which then feeds a feed cell on the opposite side. Particularly, seals extend across the mattress from narrowed portions 1800, 1802 and similarly from the other port 18' but of different lengths. The porous tubes connect to surface 3000. Outside the mattress, quick connect catches 3100 are provided so a connector with three tubes corresponding to the three port openings (and connected to a pump_) can be connected and sealed to the port to inflate the mattress and provide for varying pressure.

It should be noted that, while various functions and methods have been described and presented in a sequence of steps, the sequence has been provided merely as an illustration of one advantageous embodiment, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions described herein.

Although the invention has been described with reference to a particular arrangement of parts, features and the like, these are not intended to pressure all possible arrangements or features, and indeed many other modifications and variations will be ascertainable to those of skill in the art.

What is claimed is:

1. A port system for a mattress having first and second sets of cells and a seal in contact with at least a first portion of the first set of cells and at least a second portion of the second set of cells, the system comprising:

a main body comprising a first port and a second port;

a sealing surface fluidly isolating the first port from the second port;

a connector for coupling the first and second ports to a fluid delivery system;

wherein the first port is configured to deliver fluid under a first oscillating pressure to the first set of cells and the second port is configured to deliver fluid under a second oscillating pressure to the second set of cells, wherein the first oscillating pressure is out of phase with the second oscillating pressure, wherein the first and second ports are configured to deliver the first and second oscillating pressures to the first and second sets of cells such that the seal maintains the first portion of the first set of cells in contact with the second portion of the second set of cells as the first oscillating pressure is delivered to the first set of cells and as the second oscillating pressure is delivered to the second set of cells.

2. The port system of claim 1, wherein the sealing surface comprises a thermoplastic film.

3. The port system of claim 1, wherein the mattress comprises a cover and a base sheet, wherein the sealing surface is configured to bond to the cover and the base sheet.

4. The port system of claim 1, wherein the first port is configured to be fluidly coupled to one or more rails in the mattress.

5. The port system of claim 1, further comprising a first feed tube coupled to the first port and a second feed tube coupled to the second port.

6. The port system of claim 5, further comprising a third port fluidly isolated from the first and second ports and a third feed tube coupled to the third port for delivering fluid under pressure to a third set of cells within the mattress.

7. The port system of claim 6, further comprising a second seal fluidly isolating the third feed tube from the first and second feed tubes.

8. The port system of claim 1, wherein the first port is configured for coupling to one or more rails of the mattress.

9. The port system of claim 5, wherein the first feed tube is sealed to the first set of cells and comprises one or more perforations which fluidly couple the first feed tube to a first grouping of the first set of cells.

10. The port system of claim 5, wherein the second feed tube is sealed to the second set of cells and comprises one or more perforations which fluidly couple the second feed tube with a first grouping of the second set of cells.

11. The port system of claim 1, wherein the first oscillating pressure is 180 degrees out of phase with the second oscillating pressure.

12. A mattress comprising:

first and second sets of cells;

a first feed tube fluidly coupled to the first set of cells;

a second feed tube fluidly coupled to the second set of cells;

a first port for delivering fluid under a first oscillating pressure to the first feed tube;

a second port for delivering fluid under a second oscillating pressure to the first feed tube, wherein the first oscillating pressure is out of phase with the second oscillating pressure;

a first seal in contact with at least a first portion of the first set of cells and at least a second portion of the second set of cells, wherein the first seal maintains the first portion of the first set of cells in contact with the second portion of the second set of cells when the first and second oscillating pressures are delivered to the first and second feed tubes; and a second seal fluidly isolating the first feed tube from the second feed tube.

13. The mattress of claim 12, further comprising a connector for coupling the first and second ports to a fluid delivery system.

14. The mattress of claim 12, wherein the seal comprises a thermoplastic film.

15. The mattress of claim 12, further comprising a third port fluidly isolated from the first and second ports and a third feed tube coupled to the third port for delivering fluid under pressure to a third set of cells within the mattress.

16. The mattress of claim 12, further comprising a second seal fluidly isolating the third feed tube from the first and second feed tubes.

17. The mattress of claim 12, further comprising one or more rails, wherein the third feed tube is fluidly coupled to the one or more rails.

18. The mattress of claim 12, wherein the first feed tube is sealed to a portion of the first set of cells and comprises one or more perforations which fluidly couple the first feed tube to a first grouping of the first set of cells.

19. The mattress of claim 12, wherein the second feed tube is sealed to a portion of the second set of cells and comprises one or more perforations which fluidly couple the second feed tube with a first grouping of the second set of cells.

20. The mattress of claim 12, further comprising a base sheet having a first side and a second side opposite the first side, wherein the first set of cells extend in a substantially parallel direction along the first side of the base sheet and the second set of cells extend in a substantially parallel direction along the second side of the base sheet.

21. The mattress of claim 20, wherein the first set of cells are formed from a first sheet of material, the mattress further comprising one or more seals spaced from each other between the first sheet of material and the base sheet and the second set of cells are formed from a second sheet of material, the mattress further comprising one or more seals spaced from each other between the second sheet of material and the base sheet.

22. The mattress of claim 12, wherein the first oscillating pressure is 180 degrees out of phase with the second pressure.

* * * * *